March 10, 1970

C. R. ALLEN 3,500,217

FREQUENCY DISCRIMINATOR EMPLOYING QUADRATURE
DEMODULATION TECHNIQUES

Filed July 31, 1967

INVENTOR.
CRAIG R. ALLEN
BY
ATTORNEYS

INVENTOR.
CRAIG R. ALLEN

United States Patent Office 3,500,217
Patented Mar. 10, 1970

3,500,217
FREQUENCY DISCRIMINATOR EMPLOYING QUADRATURE DEMODULATION TECHNIQUES
Craig R. Allen, San Diego, Calif., assignor to the United States of America as represented by the Secretary of the Navy
Filed July 31, 1967, Ser. No. 657,734
Int. Cl. H03d 3/18
U.S. Cl. 329—50
10 Claims

ABSTRACT OF THE DISCLOSURE

A frequency discriminator using first and second product demodulators develops first and second frequency difference signals between the input signal and a known frequency signal. A quadrature phase shift is generated between the known freqeuncy signal received by one of the product demodulators and that received by the other product demodulator. A phase detector produces a signal as a function of phase variation between the two signals and an all-pass phase shifting means impresses a phase shift on at least one of the input signals to the phase detector commensurate with the desired response of the frequency discriminator.

The invention described herein may be manufactured and used by or for the Government of the United States of America for governmental purposes without the payment of any royalties thereon or therefor.

Background of the invention

Frequency modulation detectors or frequency discriminators using quadrature demodulation techniques are fairly well known in the present state of the art related to the present invention. One of the better known methods of single sideband reception has been described by Norgaard in the Proceedings of the IRE for December 1956. Other examples of similar techniques appear in the art such as the U.S. Patent No. 3,035,231 issued to L. J. Neelands et al. May 15, 1962 entitled Frequency Difference Discriminator. These and a considerable number of other related concepts for frequency modulation detection or frequency discrimination employ variations and modification of applications of the quadrature demodulation techniques.

Summary of the invention

The present invention is directed to a frequency discriminator or frequency modulation detector which is employed for detecting the frequency modulation of an input signal relative to a known or center frequency. In its preferred embodiment the present invention may comprise a signal source for producing signals at the known or center frequency. A first product demodulator is connected in a first channel to receive the input signal containing the frequency modulation and the signal of constant known or center freqeuncy for producing an output signal as a function of a frequency difference between the received signals. Accordingly, the first product demodulator operates in the manner of a beat frequency mixer.

An appropriate quadrature phase circuit or phase shifting means is connected to the signal source of known or center frequency signals for producing a modified signal at the known or center frequency but in quadrature phase relative to the signal originally produced by the signal source. A second product demodulator is connected in a second channel to receive the same input signal as was imposed upon the first product demodulator containing the frequency modulation which it is desired to detect. The signal produced by the quadrature phase circuit, which is of a known or center frequency but in quadrature phase, is also received by the second product demodulator as its second input to produce a second channel output signal as a function of the freqeuncy difference between the two signals received by the second product demodulator.

The second product demodulator operates substantially in the manner of the first product demodulator to produce a beat frequency signal. However, while the first product demodulator produces what may be referred to as an "in-phase" signal, the second demodulator produces a "quadrature" phase signal. Accordingly, the first channel may be referred to for a convenience of understanding as the "in-phase" channel while the second channel may be referred to as the "quadrature" phase channel. In either the first or second channel (the in-phase channel or quadrature phase channel) an all pass phase-shifting means is interposed and is operatively effective to produce a phase change varying from approximately zero phase change at DC to some phase value close to 90° or quadrature phase relationship at the limits of the desired response curve, i.e. the upper limits of the bandwidth which it is desired to detect frequency modulation. In accordance with the concept of the present invention, direct coupling capable of frequency response down to DC is preferably achieved from the demodulation outputs through the circuitry to the phase detector which produces the ultimate output in the form of an output frequency discrimination or frequency modulation detector signal. The product demodulators may be any of a number of types of conventional mixer circuits such as exemplified by a diode ring modulator, for instance. However, in many applications it may be desirable to employ a double balanced circuit to keep the input signal and the reference oscillator signal which produces the center or known frequency signal out of the phase detector. An appropriate phase shift network may be a single section, RC half-lattice, of a known type.

One of the more desirable features of this invention is that the width, i.e. the frequency separation between peaks, of the discriminator output characteristic curve may be easily and readily varied over an arbitrarily wide range by simple adjustment of a single RC product. The concept of the present invention insures that the characteristic S curve is always perfectly symmetrical about the center of known frequency provided only that the signal source of known frequency is maintained and kept exactly 90 degrees apart with respect to the phase of the quadrature channel. This is a requirement that may be readily met within the present state of the art.

The center of known frequency depends for its accuracy upon the accuracy of the frequency of a signal source such as a reference oscillator and could vary from sub-audio to the highest radio frequencies with little or no effect on linearity, symmetry, or bandwidth of the response curve.

A bandwidth of five cycles at a center frequency of 100 megacycles might be easily realizable, for example. Likewise, a bandwidth of nearly 2000 cycles at a center frequency of 1000 cycles should offer no-especially difficult problems in the present state of the art. In accordance with the concept of the present invention, both of these extremes in ratio of bandwidth to the center or known frequency would be relatively difficult to achieve by known conventional means existent in the art in its present state.

Accordingly, it is an object of the present invention to provide a frequency modulation detector or frequency discriminator having a characteristic response curve of shape and bandwidth that can readily and easily be controlled independently of the center or known frequency.

Another most important object of the present invention is to provide such a frequency modulation detector or frequency discriminator which is capable of achieving very narrow or very wide bandwidth of the characteristic response curve as may be desired.

Yet another object of the present invention is to provide such a frequency modulation detector or frequency discriminator in which bandpass filtering may be accomplished by employing low pass filters.

A further object of the present invention is to provide such a frequency modulation detector or frequency discriminator wherein appropriate limiting may be readily employed with filtering, if desired, and yet retaining the other advantages and features as described herein.

These and other advantages, features, and objects of the present invention, as well as its significantly improved operative characteristics, will be more readily appreciated from the description of several embodiments which follows when understood together with the accompanying drawings.

Brief description of the drawings

In the drawings:

As illustrated in FIG. 1, an input signal is received at an input terminal 10 having a center or known frequency $f_o$ together with frequency modulation which may be described as a varying degree of frequency change, i.e. $\pm \Delta f$. The input or received signal which is impressed upon the input terminal 10 is connected to a first product demodulator 11 and a second product demodulator 12. The product demodulators 11 and 12 may use any of a number of conventional mixer circuit techniques such as, for example, the diode ring modulator. A double balanced circuit may be desirable in many applications to keep the input signal and the reference oscillator signal out of the phase detector, as will be more fully appreciated from the following continuing description.

Figure 1:
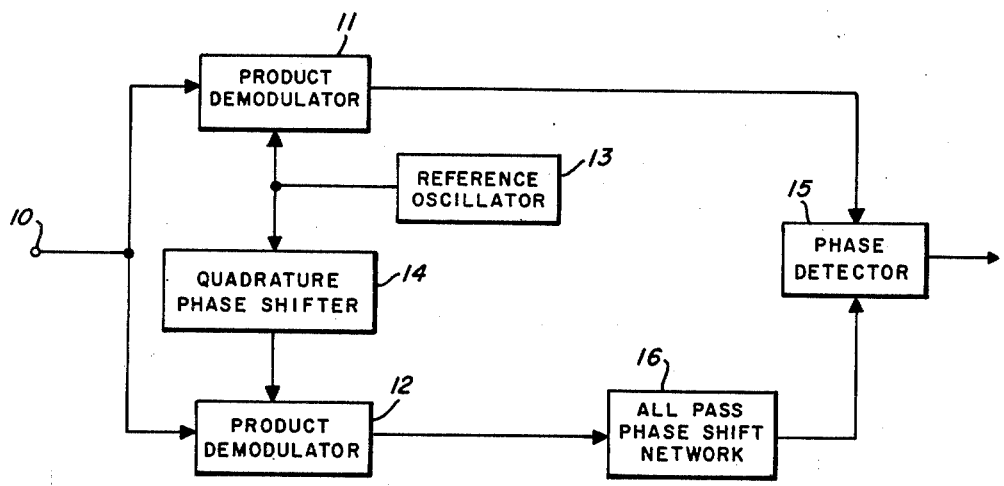
FIG. 1 is a schematic block diagram illustrating a preferred embodiment of the present invention in one of its simpler forms.

A signal source 13 which may take the form of a highly stable reference oscillator is provided and its output connected as a second input to the first product demodulator 11. The signal source 13, or reference oscillator, operates to produce a highly stable signal of constant amplitude at the $f_o$ frequency, i.e. the known or center frequency of the input signal impressed at the input terminal 10. The output of the signal source 13 is also connected as an input to a ninety degree phase shift means 14 which is operative to produce a quadrature output signal at the frequency $f_o$.

The quadrature output signal of the phase shift circuit 14 is connected as a second input to the product demodulator 12. Both the product demodulator 11 and the product demodulator 12 operate to produce a difference frequency output between their two inputs, i.e. the frequency modulated input signal received at input terminal 10 and the signal source or reference oscillator signal at $f_o$, in the case of the first product demodulator 11, or the input signal received at the input terminal 10 and the quadrature phase shifted signal at frequency $f_o$ derived from the phase shift network 14 and connected as the second input to product demodulator 12. Thus, the output of product demodulator 11 is a signal varying in frequency substantially as the $\Delta f$ variation about the center of known frequency $f_o$ as received at the input circuit input terminal 10.

The output or product demodulator 12 is likewise a beat of difference frequency between the reference oscillator or signal source frequency, $f_o$, and the $\Delta f$ variation in frequency about the known or center frequency $f_o$ of the received input signal impressed upon the input terminal 10. However, the output of product demodulator 12 is displaced in phase by ninety degrees, which phase may be either lead or lag as is convenient and desirable. The output of the product demodulator 11, which may be characterized for convenience as the "in-phase" channel is connected as one input to a phase detector 15. The output of the product demodulator 12, which may be characterized for convenience as the "quadrature" channel, is connected to an all-pass phase shift network 16. The all-pass phase shift network 16 has the operative characteristic of producing an output signal which is shifted in phase with respect to its input signal in variation from zero phase shift at DC to some value of phase shift close to ninety degrees or quadrature phase shift of the upper limits of the desired response curve as determined by the desired bandwidth of frequency modulation detection. Additionally, another most important characteristic of the all-pass phase shift network 16 is that the amplitude of the output of the network is constant regardless of frequency variation. That is, there should desirably be no change in amplitude as a result of any change or variation in frequency. This is fundamentally the definition of an "all-pass" network.

The output of the all-pass phase shift network 16 is connected as a second input to the phase detector 15. The phase detector 15 may be any suitable type such as a linear or cosine phase detector type. Its operative characteristic is that its output is directly proportional to the complement of the phase angle between its input or proportional to the cosine of that phase angle. Depending in part whether a linear or cosine type of phase detector is employed, different response characteristic curves will result. For purposes of discussion and illustration, a cosine phase detector will be assumed in the following discussion. A double balanced phase detector may be necessary for most applications to prevent low frequencies at the phase detector inputs from appearing at its output.

Figure 2:
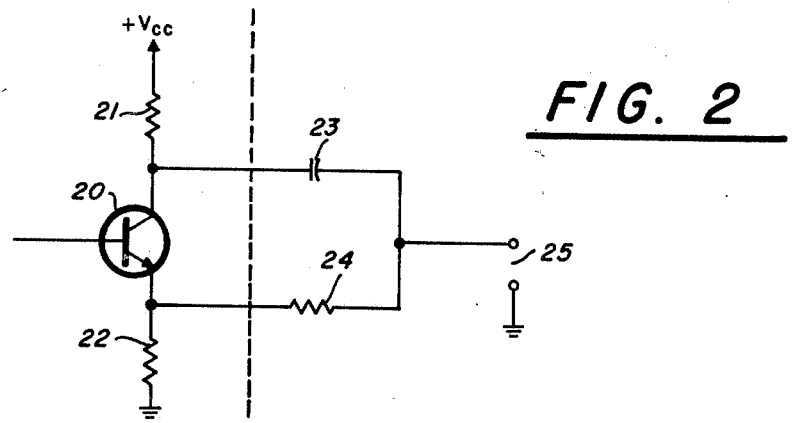
FIG. 2 is a schematic wiring diagram illustrating a typical all-pass phase shift network which may be employed in accordance with the teaching of the present invention.

FIG. 2 illustrates in a schematic wiring diagram form the details of an appropriate all-pass phase shift network of the single section, RC half lattice type. A transistor 20 is connected to receive the input from product demodulator 12. The transistor 20 is connected to an appropriate voltage source $V_{cc}$ through a resistor 21 and to ground potential through a resistor 22. An output is developed across the transistor 20 as a result of the input signal impressed upon it, which output is connected through an appropriate capacitor 23 and an appropriately valued resistive element 24 to provide an output signal at an output terminal 25.

The operation of the embodiment of FIG. 1 employing the single-section, RC half-lattice, all-pass phase shift network as illustrated in FIG. 2 will be analyzed assuming (1) the employment of a cosine phase detector, and (2) that the phase lag $\theta(f)$ is produced by the RC half-lattice network of FIG. 2. It will be recalled that in the explanation of the operation of the embodiment of FIG. 1 it was noted that the output of the product demodulator 12 is in phase quadrature with the corresponding output signals of the product demodulator 11, with the two channels through which the respective signals pass being characterized as the "quadrature" channel and the "in-phase" channel, respectively. Accordingly, the operation of the embodiment illustrated in FIG. 1 is such that the output of the quadrature channel product demodulator 12 is of a leading phase relative to the phase of the corresponding output signal of the in-phase channel product demodulator 11 if a signal is derived from an input to the input terminal 10 having a component frequency above $f_o$; conversely, the output of the quadrature channel product demodulator 12 will have a lagging phase if the signal is derived from an input signal to the input terminal 10 having a component frequency below $f_o$.

If a zero impedance, balanced source and an infinite impedance, load is assumed for the RC section of the circuit of FIG. 2, the node-voltage equation may be shown to confirm that the circuit FIG. 2 is an all-pass network producing a phase lag.

$$\theta(f) = 2 \arctan\left(\frac{f}{f_1}\right)$$

where $f_1 = 1/2\pi RC$. If a cosine phase detector is used, however, its output will be:

$$V = \cosine\ (\pm 90° - \theta) = \pm \sine\ \theta = \pm \sine\left(2 \arctan \frac{f}{f_1}\right)$$

$$= \pm 2\left(\frac{f}{f_1}\right) 1 + \left(\frac{f}{f_1}\right)^2$$

Equation 1

The last expression in Equation 1 above follows from the trigonometric identity:

$$\sine\ 2A = \frac{2 \tan A}{1 + \tan^2 A}$$

where $$A = \arctan \frac{f}{f_1} \text{ or } \frac{f}{f_1} = \tan A$$

The plus sign in Equation 1 applies to signals derived from an input of frequency above $f_o$; the minus sign conversely applies to signals derived from an input of frequency below $f_o$. Equation 1 describes a discriminator characteristic S curve similar in shape to the response of a standard Foster-Seeley discriminator circuit. Its linearity is adequate for many uses, provided the peak frequency deviation of the input is held to a value somewhat less than $f_1 = 1/2\pi RC$ cycles.

Figure 2A:
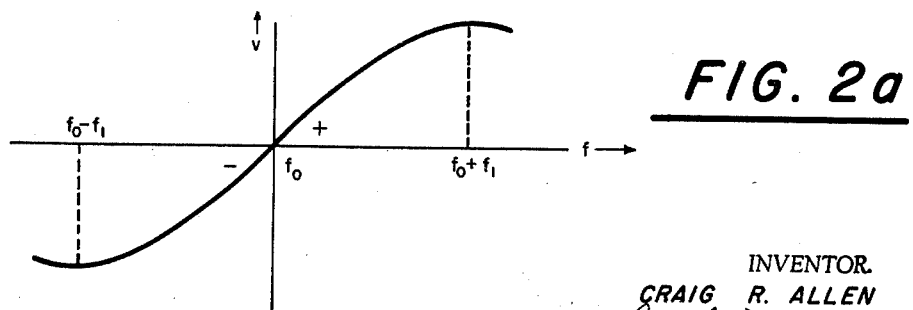
FIG. 2a is a graphical representation of the discriminator response curve of a typical embodiment of the present invention.

The illustration of FIG. 2a shows the approximate shape of the resulting discriminator response curve. One of the most unusual and desirable features of the operation of the circuit illustrated in FIGS. 1 and 2 is that the width of the discriminator S curve, i.e., the frequency separation between peaks, may be easily and readily varied over an arbitrarily wide range by adjustment of a single RC product. The characteristic S curve is always perfectly symmetrical about the center or known frequency $f_o$, provided only that the signal source producing signals at $f_o$ such as a reference oscillator 13 in FIG. 1 has the stability and reliability to provide signals to the two demodulators 11 and 12 which are kept exactly ninety degrees apart in phase. This, however, is a requirement which may be easily and readily met within the present state of the art.

The stability of the center or known frequency, $f_o$, depends only upon the stability and reliability of the frequency of the signals produced by the signal source 13, such as any of several known types of reliabile oscillators. In accordance with the concept of the present invention, however, the frequency $f_o$ may be made to vary as desired to accommodate input signals of varying center or known frequencies from subaudio to high radio frequencies with no undesirable effect on linearity, symmetry, or bandwidth of the response curve as illustrated in FIG. 2a. Moreover, the present invention is so conceived that a bandwidth of 5 cycles at a center or known frequency, $f_o$, of 100 megacycles could be easily realizable. By contrast, a bandwidth of nearly two kilocycles at a center or known frequency, $f_o$, of one kilocycle should offer no particular problem or difficulty. These extremes in ratio of bandwidth to the center frequency $f_o$ would generally be quite difficult to achieve by known, conventional frequency discriminator means.

In accordance with the teaching of the present invention, an extremely linear discriminator characteristic response curve may be achieved by using a cosine phase detector, if $\theta(f)$ were given by the equation:

$$\theta(f) = \arcsine\ kf \text{ for } 0 \leq f \leq f_m \text{ and } kf_m < 1$$

Equation 2

The restriction $kf_m$ is smaller than one is necessary because no real angle has a sine greater than unity. Actually, the $kf_m$ can only approach, but not equal, unity because the slope $d\theta/df$ of the $\theta(f)$ curve becomes infinite when the value of the arcsin equals unity, which represents a physically unrealizable network.

For the case where $\theta f$ is given by Equation 2, the discriminator response is:

$$V = \cosine\ (\pm 90° - \theta) = \pm \sine\ (\arcsin\ kf) = \pm kf$$

Equation 3

Further, the plus or minus signs refer to inputs above and below $f_o$, respectively, in the same context as before. That is to say, that the response is perfectly linear for input frequencies from $f_o - f_m$ to $f_o + f_m$.

Figure 3:
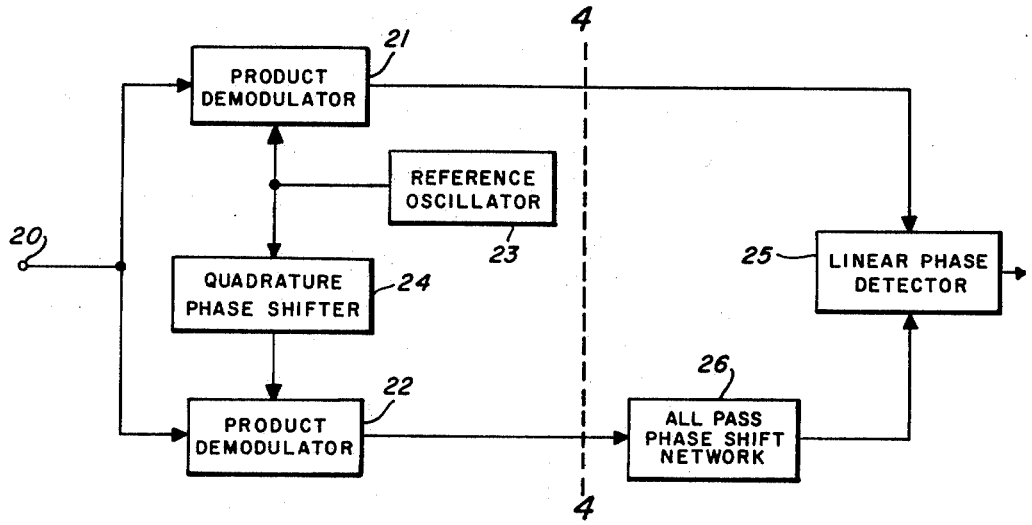
FIG. 3 a is schematic block diagram of an embodiment of the present invention employing a linear phase detector rather than a cosine phase detector.

The arrangement of an embodiment of the inventive concept including a linear phase detector would be as is illustrated in FIG. 3, where an input terminal 20 is adapted and arranged to accept the input signal from which it is desired to extract and detect the frequency modulation. A product demodulator 21 is connected in the in-phase channel, while a similar product demodulator 22 is connected in the quadrature phase channel of the circuit. A signal source 23, which may take the form of a reference oscillator, supplies a signal at the center or known frequency, $f_o$. In a manner similar to the operation of the equipment illustrated in the embodiment of FIG. 1, a quadrature phase shifter 24 operates on the signal source output signal to shift it by ninety degrees. The signal at $f_o$, thus shifted in phase by ninety degrees, provides a second input in the quadrature phase channel to the product demodulator 22. An all-pass phase shift network 26 operates in the quadrature phase channel much in the manner as previously described in connection with the embodiment shown and illustrated in FIG. 1. The output of the product demodulator 21 is connected as an input to the linear phase detector 25 which operates in the manner described hereinbefore and a second input to the linear phase detector 25 is provided by the output of the all-pass phase shift network 26.

Figure 4:
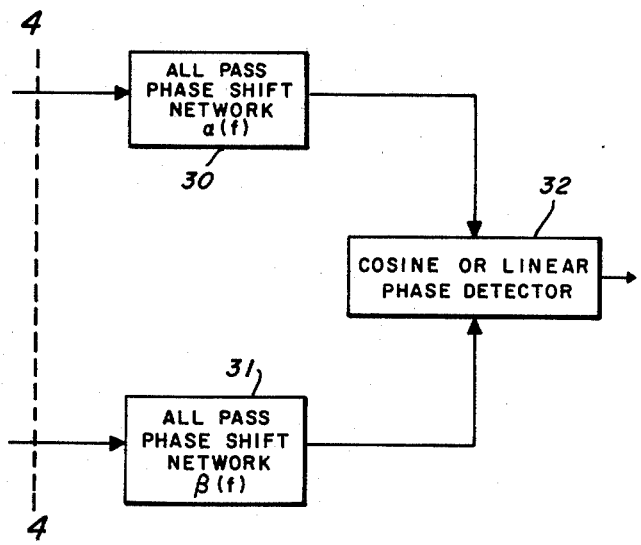
FIG. 4 is a schematic block diagram of the present invention illustrating the employment of an all-pass phase shift network in the "in-phase" channel of the circuit as well as in the quadrature phase channel of the network.

It may be readily appreciated that approximating an arcsin phase response would likely require a considerably more complicated network than that illustrated in FIG. 2. A possible solution to this problem might lie in using pair of all-pass phase shift networks as shown in FIG. 4. FIG. 4 schematically illustrates an all-pass phase shift network 30 in the in-phase channel and an all-pass phase shift network 31 in the quadrature phase channel. The inputs to these respective all pass phase shift networks 30 and 31 would be connected at the points indicated by the dotted line 4—4 as shown in FIG. 3. The all-pass phase shift network 30 would provide a phase shift of $\alpha(f)$ while the all-pass phase shift network 31 would provide a phase shift of $\beta(f)$. The output of the network 30 provides one input to a cosine or linear phase detector 32, while the output of the network 31 provides the second input to the cosine or linear phase detector 32. The phase detector 32 operates in the manner previously described in connection with the explanation of the operation of the embodiments as shown in FIG. 1 and FIG. 3 and as explained more fully hereinbefore. The pair of all-pass phase shift networks 30 and 31 as shown in FIG.

4, together with the remainder of the operational circuitry as indicated in FIG. 3, function to produce a phase difference $\alpha-\beta$ which must approximate the required $\theta(f) = \arcsin kf$.

Figure 5:
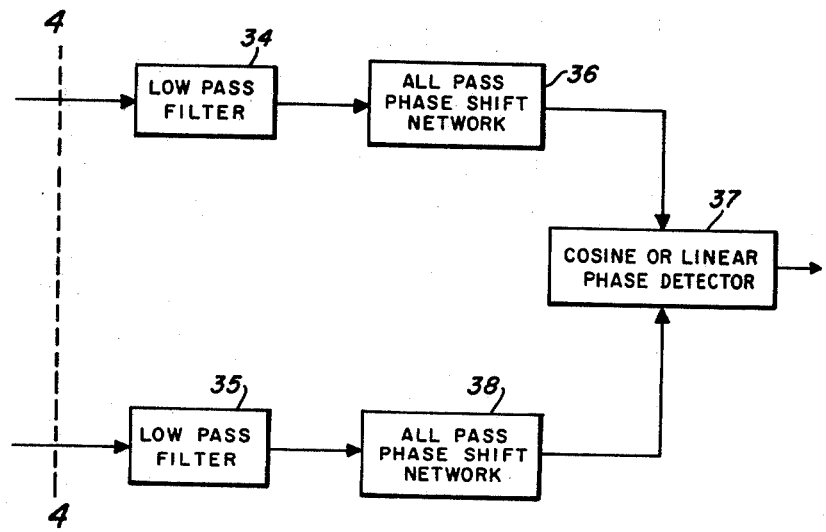
FIG. 5 is a schematic block diagram illustrating the employment of low pass filters in addition to the other necessary circuit elements illustrated.

For reasons readily appreciated by those skilled in the art, many applications could require that frequency discrimination be preceded in the circuit arrangement by a band-pass filter. The circuit illustrated in FIG. 5 shows how a pair of low-pass filters may be employed to accomplish that band-pass function. The circuitry illustrated in FIG. 5 would be connected to the in-phase channels and quadrature phase channels at points 4—4 of the embodiment illustrated in FIG. 3 in the manner previously explained in connection with the description of the operation of the dual, or pair of all-pass phase shift networks as employed in FIG. 4.

The low-pass filter 34 is connected in the in-phase channel, while a similarly operative low-pass filter 35 is connected in the quadrature phase channel. The low-pass filter 34 may be connected to impress upon its output an all-pass phase shift network 36; dual or pairs of all-pass phase shift networks may or may not be employed in accordance with the requirements of a particular application. Accordingly, the output of an all-pass phase shift network 36, if employed, would provide one input to a cosine or a linear phase detector 37. In the event that the all-pass phase shift network 36 were not employed in the in-phase channel of the circuitry, the output of the low-pass filter 34 would be connected directly as an input to the cosine or linear phase detector 37.

The output of the low-pass filter 35 as connected in the quadrature phase channel, provides an input to the all-pass phase shift network 38 which in turn has its output connected as the second input to the cosine or linear phase detector 37. The low-pass filters 34 and 35 may be any suitable band-pass filter means which is suitable for a particular application for which the embodiment of the present invention is designed and intended. Thus the low-pass filters 34 and 35 may be any appropriate band-pass filters as desired. As may be readily understood, the operation of the circuit arrangement as illustrated in FIG. 5 together with the forepart of the circuitry of FIG. 3, is substantially that as previously described. However, if the low pass filters cut-off at $f_m$, the pass-band of the entire circuit will be $f_o \pm f_m$. The bandwidth $2f_m$ can be made as wide or as narrow as may be desired regardless of the center or known frequency, $f_o$. Normally, of course, it will be usual that $f_m$ will be made somewhat smaller than the displacement, $f_1$, of the discriminator characteristic operation curve peaks from the center frequency, $f_o$, so that the linear portion of the S curve will extend through the pass-band.

Quite often a frequency discrimination operation may be preceded by a limiting function in order to realize the full benefits of frequency modulation detection, i.e. noise rejection, amplitude modulation rejection, improvement of signal-to-noise ratios for inputs above threshold, reduction of interference by means of the frequency modulation capture effect, etc. Any appropriate and suitable conventional limiter may be used in the frequency discriminator of the present invention. It may be sometimes difficult, however, to design a good limiter at the higher radio frequencies. This is particularly true if vacuum tubes cannot be used because of some prevailing consideration in the application of the circuit.

Figure 6:
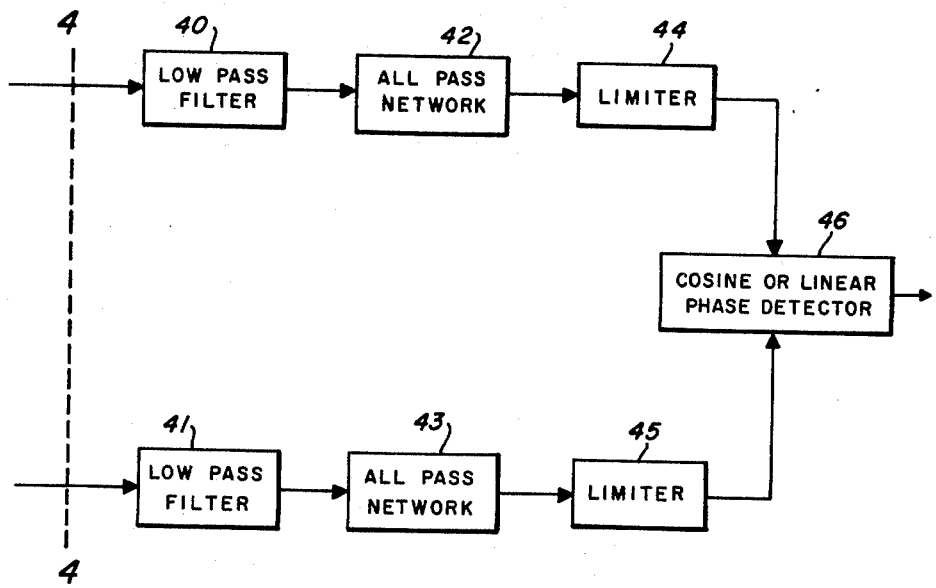
FIG. 6 is a schematic block diagram illustrating the employment of both low pass filters in both channels of the circuitry and additionally using limiters in both the "in-phase" channel and the "quadrature" phase channel of the circuitry.

The circuit of FIG. 6 permits limiting at base-band which is often a much easier objective to achieve. In the circuit schematically illustrated in FIG. 6 the inputs to the in-phase channel and the quadrature phase channel are connected at the point 4—4 of the circuit of FIG. 3 so as to include the forepart of that circuit and substitute for the last part of the circuit the arrangement illustrated in FIG. 6. A particular merit of the circuit of FIG. 6 is that it permits use of the low-pass filters 40 and 41 to accomplish band-pass filtering and yet allows limiting by the limiters 44 and 45 to be accomplished after the filtering. This is important because it is frequently a requirement that the these operations be achieved in that particular order so as to avoid the capture of the limiter by interfering signals outside the pass-band of the system.

The all-pass phase shift network 42 may be included or not as desired in the circuit together with the all-pass phase shift network 43, employing either a single all-pass phase shift network or a pair of such networks in accordance with the requirements of the application as previously described and explained in connection with the circuit arrangement illustrated schematically in FIG. 4. The phase detector 46 operates in the manner of the circuit elements previously described in connection with the circuit arrangements illustrated schematically in FIG. 1 and FIG. 3.

From an understanding of the description of the foregoing disclosed embodiments of the present invention it will be readily appreciated that the essential components of the frequency discriminator concept of the present invention are a pair of product demodulators driven in-phase quadrature by a suitable signal source at center frequency $f_o$, an all-pass phase shift network in at least one of the two channels, i.e., the in-phase channel or the quadrature phase channel, to produce a differential phase shift whose variation with frequency controls the shape and bandwidth as well as the overall characteristic response curve of the circuit, and in addition a phase detector to perform phase comparison and thus produce the desired discriminator output.

A significant advantage of the present inventive concept is that the shape and bandwidth of the characteristic response curve of the frequency discriminator or frequency demodulation detector can be controlled independently of the center frequency $f_o$.

Moreover, a very narrow or a very wide bandwidth may be readily and easily achieved as desired for particular applications. Additionally, the bandwidth variations may be easily achieved by variation of a relatively simple RC product.

A further highly desirable advantage and feature of the present invention resides in the fact that band-pass filtering may be accomplished by low-pass filters with limiting functions performed at subsequent points in the signal paths of the circuitry.

Obviously many modifications and variations of the present invention are possible in the light of the above teachings. It is therefore to be understood that the invention may be practiced otherwise than as specifically described.

What is claimed is:
1. A frequency discriminator for detecting frequency modulation of an input signal relative to a known frequency comprising:
   a signal source for producing signals of said known frequency;
   first and second product demodulators connected in first and second channels, respectively, to receive said input signal and said signals of said known frequency for producing first and second output signals as functions of the frequency differences between the respective pairs of received signals;
   means connected in circuit with said signal source and said first and second product demodulators for causing a quadrature phase shift between said signal of known frequency received by said first product demodulator and said signal of known frequency received by said second product demodulator;
   phase detector means connected to receive first and second channel signals for producing an output signal as a function of the phase variation therebetween; and
   all-pass phase shifting means connected in at least one of said channels for impressing a phase shift on at least one of the input signals to said phase detector over a determinable frequency bandwidth commensurate with the desired response of said frequency discriminator.

2. A frequency discriminator for detecting frequency modulation of an input signal relative to a known frequency comprising:

a signal source for producing signals of said known frequency;

a first product demodulator connected in a first channel to receive said input signal and said signals of known frequency for producing a first channel output signal as a function of the frequency difference between the received signals;

a quadrature phase shift means connected in circuit with said signal source for producing an output signal of said known frequency in quadrature phase;

a second product demodulator connected in a second channel to receive said input signal and said signal of known frequency in quadrature phase for producing a second channel output signal as a function of the frequency difference between the received signals;

phase detector means connected to receive first and second channel signals for producing an output signal as a function of the phase variation therebetween; and all-pass phase shifting means connected in at least one of said channels for impressing a phase shift on at least one of the input signals to said phase detector over a determinable frequency bandwidth commensurate with the desired response of said frequency discriminator.

3. A frequency discriminator as claimed in claim 1 wherein said all-pass phase shifting means comprises a network of the single-section, RC, half-lattice type.

4. A frequency discriminator as claimed in claim 1 wherein said all-pass, phase shifting means comprises a delay line.

5. A frequency discriminator as claimed in claim 1 wherein said phase detector means is of the cosine phase detector type.

6. A frequency discriminator as claimed in claim 1 wherein said phase detector means is of the linear phase detector type.

7. A frequency discriminator as claimed in claim 1 wherein each of said first and second channels has an all-pass phase shifting means connected therein.

8. A frequency discriminator as claimed in claim 1 and including band-pass filter means connected in each of said first and second channels.

9. A frequency discriminator as claimed in claim 8 and including limiter means connected in each of said first and second channels.

10. A frequency discriminator as claimed in claim 9 wherein said limiter means is operative in each of said first and second channels at a point of signal flow beyond said bandpass filter means.

References Cited

UNITED STATES PATENTS

| | | | |
|---|---|---|---|
| 2,151,464 | 3/1939 | Curtis | 332—45 |
| 2,668,238 | 2/1954 | Frink | 332—45 X |
| 3,060,380 | 10/1962 | Howells et al. | |
| 3,079,563 | 2/1963 | Marsh et al. | 329—145 X |

ALFRED L. BRODY, Primary Examiner

U.S. Cl. X.R.

307—233; 325—329; 328—133; 329—124, 145, 112; 332—44